US008866111B2

(12) United States Patent
Loopstra et al.

(10) Patent No.: US 8,866,111 B2
(45) Date of Patent: Oct. 21, 2014

(54) RADIATION SOURCE AND METHOD FOR LITHOGRAPHIC APPARATUS AND DEVICE MANUFACTURING METHOD

(75) Inventors: Erik Roelof Loopstra, Eindhoven (NL); Johan Frederik Dijksman, Weert (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/233,116

(22) PCT Filed: Jul. 4, 2012

(86) PCT No.: PCT/EP2012/063019
§ 371 (c)(1), (2), (4) Date: Feb. 20, 2014

(87) PCT Pub. No.: WO2013/020758
PCT Pub. Date: Feb. 14, 2013

(65) Prior Publication Data
US 2014/0160450 A1 Jun. 12, 2014

Related U.S. Application Data

(60) Provisional application No. 61/515,716, filed on Aug. 5, 2011.

(51) Int. Cl.

| | |
|---|---|
| ***H05G 2/00*** | (2006.01) |
| ***G01N 21/33*** | (2006.01) |
| ***H05H 1/00*** | (2006.01) |
| ***B05B 17/06*** | (2006.01) |
| *B05B 1/24* | (2006.01) |
| *B05B 1/08* | (2006.01) |

(52) U.S. Cl.
CPC . *H05G 2/003* (2013.01); *B05B 1/24* (2013.01); *B05B 1/086* (2013.01); *B05B 17/0607* (2013.01); *H05G 2/005* (2013.01); *H05G 2/006* (2013.01)
USPC .................... 250/504 R; 250/365; 250/493.1; 239/102.1; 239/103; 378/119; 378/145

(58) Field of Classification Search
CPC ....... H05G 2/003; H05G 2/001; H05G 2/008; B05B 1/24
USPC ........... 250/504 R, 493.1, 365; 378/119, 145; 239/102.1, 103
See application file for complete search history.

(56) References Cited

U.S. PATENT DOCUMENTS 4,380,018 A 4/1983 Andoh et al.
5,560,543 A 10/1996 Smith et al.

(Continued)

FOREIGN PATENT DOCUMENTS

DE 10013450 9/2001
JP 61-153936 7/1986

OTHER PUBLICATIONS

International Search Report and Written Opinion mailed Oct. 9, 2012 in International Patent Application No. PCT/EP2012/063019.

*Primary Examiner* — Nikita Wells
(74) *Attorney, Agent, or Firm* — Pillsbury Winthrop Shaw Pittman LLP

(57) ABSTRACT

A radiation source for generating EUV from a stream of molten fuel droplets by LPP (Laser Produced Plasma) or (Dual Laser Plasma) has a fuel droplet generator arranged to provide a stream of droplets of fuel and at least one laser configured to vaporize at least some of the droplets of fuel, whereby radiation is generated. The fuel droplet generator has a nozzle, a feed chamber, and a reservoir, with a pumping device arranged to supply a flow of fuel in molten state from the reservoir through the feed chamber and out of the nozzle as a stream of droplets. The feed chamber has an outer face in contact with a drive cavity filled with a liquid, and the liquid is driven to oscillate by a vibrator with the oscillation transmissible to the molten fuel in the feed chamber from the outer face of the feed chamber through the liquid.

18 Claims, 3 Drawing Sheets

(56) References Cited

U.S. PATENT DOCUMENTS

| | | | | |
|---|---|---|---|---|
| 8,598,551 | B2 * | 12/2013 | Mestrom et al. | 250/504 R |
| 2002/0029659 | A1 | 3/2002 | Orme-Marmerelis et al. | |
| 2006/0017026 | A1 | 1/2006 | Hergenhan et al. | |
| 2006/0192154 | A1 | 8/2006 | Algots et al. | |
| 2012/0280148 | A1 * | 11/2012 | Loopstra et al. | 250/492.1 |
| 2013/0077070 | A1 * | 3/2013 | Schimmel et al. | 355/67 |
| 2013/0077071 | A1 * | 3/2013 | Van Den Akker et al. | 355/67 |
| 2014/0160453 | A1 * | 6/2014 | Kempen et al. | 355/53 |

* cited by examiner

RADIATION SOURCE AND METHOD FOR LITHOGRAPHIC APPARATUS AND DEVICE MANUFACTURING METHOD

CROSS-REFERENCE TO RELATED APPLICATIONS

This application is the U.S. national phase entry of International Patent Application No. PCT/EP2012/063019, filed Jul. 4, 2012, which claims the benefit of U.S. provisional application 61/515,716, which was filed on 5 Aug. 2011, both of which are incorporated herein in their entireties by reference.

FIELD

The present invention relates to an EUV radiation source, lithographic apparatus and methods for manufacturing devices.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. comprising part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned.

Lithography is widely recognized as one of the key steps in the manufacture of ICs and other devices and/or structures. However, as the dimensions of features made using lithography become smaller, lithography is becoming a more critical factor for enabling miniature IC or other devices and/or structures to be manufactured.

A theoretical estimate of the limits of pattern printing can be given by the Rayleigh criterion for resolution as shown in equation (1):

$$CD = k_1 * \frac{\lambda}{NA} \tag{1}$$

where $\lambda$ is the wavelength of the radiation used, NA is the numerical aperture of the projection system used to print the pattern, $k_1$ is a process dependent adjustment factor, also called the Rayleigh constant, and CD is the feature size (or critical dimension) of the printed feature. It follows from equation (1) that reduction of the minimum printable size of features can be obtained in three ways: by shortening the exposure wavelength $\lambda$, by increasing the numerical aperture NA or by decreasing the value of $k_1$.

In order to shorten the exposure wavelength and, thus, reduce the minimum printable size, it has been proposed to use an extreme ultraviolet (EUV) radiation source. EUV radiation is electromagnetic radiation having a wavelength within the range of 5-20 nm, for example within the range of 13-14 nm, for example within the range of 5-10 nm such as 6.7 nm or 6.8 nm. Possible sources include, for example, laser-produced plasma sources, discharge plasma sources, or sources based on synchrotron radiation provided by an electron storage ring.

EUV radiation may be produced using a plasma. A radiation system for producing EUV radiation may include a laser for exciting a fuel to provide the plasma, and a source collector module for containing the plasma. The plasma may be created, for example, by directing a laser beam at a fuel, such as particles or droplets of a suitable material (e.g. tin), or a stream of a suitable gas or vapour, such as Xe gas or Li vapour. The resulting plasma emits output radiation, e.g., EUV radiation, which is collected using a radiation collector.

The radiation collector may be a mirrored normal incidence radiation collector, which receives the radiation and focuses the radiation into a beam. The source collector module may include an enclosing structure or chamber arranged to provide a vacuum environment to support the plasma. Such a radiation system is typically termed a laser produced plasma (LPP) source.

When molten fuel droplets are used as fuel from which a radiation-generating plasma is produced, a second laser may also be provided to preheat the fuel droplets before the first laser beam and is incident upon the droplets in order to generate the plasma and subsequently the radiation. An LPP source which uses this approach may be referred to as a dual laser pulsing (DLP) source.

A fuel droplet generator may be arranged to provide a stream of droplets of molten fuel to a plasma formation location of the radiation source.

SUMMARY

Fuel droplet generators may comprise a nozzle through which molten fuel is driven under pressure to be injected from the nozzle as a stream of droplets. The natural break-up of a stream of liquid issuing from a nozzle is known as Rayleigh break-up. The Rayleigh frequency, which corresponds to the rate of droplet production of the nozzle is related to the mean velocity of the fuel at the nozzle and the diameter of the nozzle, as represented in equation (2):

$$f_{Rayleigh} = \frac{\text{mean velocity}}{4.5 \text{ nozzle diameter}} \tag{2}$$

Although Rayleigh break-up of a stream of fuel may occur without excitation, a vibrator such as a piezoelectric actuator may be used to control the Rayleigh break-up by modulating or oscillating the pressure of molten fuel at the nozzle. Modulating the pressure inside the nozzle may modulate the exit velocity of the liquid fuel from the nozzle, and cause the stream of liquid fuel to break-up into droplets in a controlled manner directly after leaving the nozzle.

If the frequency of oscillation applied by a vibrator is sufficiently close to the Rayleigh frequency of the nozzle, droplets of fuel are formed, the droplets being separated by a distance which is determined by the mean exit velocity from the fuel nozzle and by the oscillation frequency applied by the vibrator. If the oscillation frequency applied by the vibrator is substantially lower than the Rayleigh frequency, then instead of a periodic stream of fuel droplets being formed, clouds of fuel may be generated. A given cloud of fuel may include a group of droplets travelling at a relatively high speed and a group of droplets travelling at a relatively low speed (the speeds being relative to the average speed of the stream of fuel exiting the nozzle). These clouds may coalesce together to form a single fuel droplets. In this way a periodic stream of fuel droplets may be generated by applying an oscillation frequency to the vibrator which is significantly lower than the Rayleigh frequency. The spacing between the droplets is still governed by mean exit velocity and the oscillation frequency: the spacing between the droplets increases with decreasing oscillation frequency.

Piezoelectric transducers may be used as vibrators to apply oscillation to a nozzle. For instance, where the nozzle is in the form of a capillary tube acting as a fuel feed chamber arranged to feed fuel, supplied from a fuel reservoir connected to its proximal end, to a nozzle formed as a restriction at its distal end, a piezoelectric vibrator may be in the form of a sleeve cemented or adhered to an outer face of the capillary. The use of molten fuel such as molten tin means that the cement or adhesive used to adhere the vibrator to the outer face of the capillary should be one which does not lose adhesion at the operating temperature of the fuel supply.

In extended use, adhesion between a vibrator and the outer face of the feed chamber (such as the outer face of the capillary) may be lost, leading to loss of transmissivity (i.e. poor acoustic coupling) between the vibrator and the molten fuel in the feed chamber.

Furthermore, piezoelectric vibrators may be brought to a temperature at or just below that of the molten fuel, because of direct contact with the outer wall of the feed chamber, and this may mean that the piezoelectric vibrators operate at a temperature above their Curie temperature, leading to low efficiency.

Vibrators that are not of a piezoelectric nature may be unable to operate effectively at the high temperature required to maintain the fuel in a molten state.

An aspect of embodiments of the invention, amongst others, is to provide apparatus and methods for generation of streams of fuel droplets for use in lithographic radiation sources and apparatus and methods for controlling fuel droplet size and separation in such streams which address or overcome at least some of the problems set out above. In particular, it is an aspect of embodiments of the invention to provide apparatus and methods which may be used to cause oscillatory stimulation of a fuel supply at a nozzle, wherein such apparatus and methods provide alternatives to prior art apparatus and methods, and enable efficient control of the breakup of a stream of molten fuel exiting the nozzle.

Throughout this specification, the term “comprising” or “comprises” means including the component(s) specified but not to the exclusion the presence of others. The term “consisting essentially of” or “consists essentially of” means including the components specified but excludes other components except for materials present as impurities, unavoidable materials present as a result of processes used to provide the components, and components added for a purpose other than achieving the technical effect of the invention.

Whenever appropriate, the use of the term “comprises” or “comprising” may also be taken to include the meaning “consists essentially of” or “consisting essentially of” and may also be taken to include the meaning of “consists of” or “consisting of”.

Optional and/or preferred features as set out herein be used either individually or in combination with each other where appropriate and particularly in the combinations as set out in the accompanying claims. The optional and/or preferred features for each aspect of the invention set out herein are also applicable to any other aspects of the invention, where appropriate.

An aspect of the invention provides a radiation source comprising a fuel droplet generator arranged to provide a stream of droplets of fuel and at least one laser configured to vaporize at least some of said droplets of fuel, whereby radiation is generated, wherein the fuel droplet generator comprises a nozzle, a feed chamber, a reservoir, and a pumping device arranged to supply a flow of fuel in molten state from the reservoir through the feed chamber and out of the nozzle as a stream of droplets, wherein the feed chamber has an outer face in contact with a drive cavity, wherein the drive cavity is filled with a liquid, and the liquid is arranged to be drivable to undergo oscillation by a vibrator operably connected to the drive cavity, and wherein said oscillation is transmissible to said molten fuel in the feed chamber from the outer face of the feed chamber through the liquid.

An aspect of the invention provides a lithographic apparatus comprising a radiation source described above, arranged to generate a radiation beam, and further comprising an illumination system configured to condition the radiation beam, a support constructed to support a patterning device, the patterning device being capable of imparting the radiation beam with a pattern in its cross-section to form a patterned radiation beam, a substrate table constructed to hold a substrate, and a projection system configured to project the patterned radiation beam onto a target portion of said substrate.

An aspect of the invention provides a method comprising emitting a stream of fuel droplets from a nozzle and using a laser to vaporize at least some of the droplets of fuel to generate radiation, wherein molten fuel is pumped from a reservoir, through a feed chamber and out through the nozzle as the stream of droplets, wherein the feed chamber has an outer face in contact with a first cavity, filled with a liquid, and wherein the first cavity is driven to undergo oscillation by a vibrator, and the oscillation is transmitted through the liquid and through the outer face of the feed chamber to the fuel in the feed chamber.

The radiation source according to an aspect of the invention described above is particularly suitable for putting into effect the method of an aspect of the invention described above.

The radiation source according to an aspect described above, and for use in the other aspects of the invention, comprises a fuel droplet generator arranged to provide a stream of droplets of fuel. At least one laser is configured to vaporize at least some of said droplets of fuel, whereby radiation is generated by the radiation source of the first aspect of the invention.

It should be understood that the fuel droplet generator as described herein, which forms part of the radiation source of the first aspect of the invention, may be considered independently as an aspect of the invention in its own right. Hence, an aspect of the invention provides a fuel droplet generator for providing a stream of droplets of fuel for a radiation source, wherein the fuel droplet generator comprises a nozzle, a feed chamber, a reservoir, and a pumping device arranged to supply a flow of fuel in molten state from the reservoir through the feed chamber and out of the nozzle as a stream of droplets, wherein the feed chamber has an outer face in contact with a drive cavity, wherein the drive cavity is filled with a liquid, and the liquid is arranged to be drivable to undergo oscillation by a vibrator operably connected to the drive cavity, and wherein said oscillation is transmissible to said molten fuel in the feed chamber from the outer face of the feed chamber through the liquid.

The radiation source of the invention will typically be configured to generate radiation such as EUV (extreme ultraviolet radiation). The EUV radiation may for example have a wavelength within the range of 5-20 nm, for example within the range of 13-14 nm, for example within the range of 5-10 nm such as 6.7 nm or 6.8 nm.

The fuel droplet generator may comprise a nozzle, a feed chamber, a reservoir, and a pumping device arranged to supply a flow of fuel in molten state from the reservoir through the feed chamber and out of the nozzle as a stream of droplets. The pumping device may simply be a pressure generator applied to the reservoir to force the fuel in its molten state from the reservoir through the feed chamber and out of the outlet orifice of the nozzle a stream of droplets.

The feed chamber has an outer face in contact with a drive cavity. The drive cavity is filled with a liquid, and the liquid is arranged to be drivable to undergo oscillation by a vibrator operably connected to the drive cavity. The oscillation is transmissible in use to the molten fuel in the feed chamber, with the oscillation transmitted as acoustic waves from the outer face of the feed chamber and through the liquid.

The feed chamber may have a first resonant frequency and the drive cavity may have a second resonant frequency.

The drive cavity may suitably comprise a tuning device whereby the second resonant frequency of the drive cavity is variable.

The drive cavity may comprise a first cavity in direct contact with the outer face of the feed chamber, wherein the first cavity is in fluidic connection with a second cavity through a bore of a connection tube, and wherein the second cavity has the vibrator operably connected thereto, wherein the first cavity, second cavity and connection tube are filled with the liquid, and wherein the first cavity is drivable to undergo oscillation by acoustic transmission of said oscillation from the second cavity through the liquid, through the connection tube.

The connection tube is suitably a tube with a rigid wall or walls whereby acoustic energy is transmissible from the second to the first cavity through the connection tube.

The second cavity may comprise a tuning device whereby the second resonant frequency of the drive cavity is variable. The tuning device may be, for instance, a device for adjustment of the volume of the second cavity.

The vibrator may suitably be arranged to oscillate an outer wall of the second cavity to drive the liquid to undergo oscillation in use. Hence, the liquid in the second cavity is oscillated and the oscillation may be transmitted as acoustic energy through the connection tube to the first cavity to drive the molten fuel in the feed chamber.

The fuel droplet generator may comprise a cooling device arranged to maintain the vibrator, in use, at a temperature lower than the temperature required to maintain said fuel in a molten state.

For instance, the vibrator, in use, may be maintained at a temperature of 100° C. or less, such as about 50° C. or less, for example about 30° C. or less.

The cooling device may include a cooling device arranged to maintain the second cavity and vibrator, in use, at a temperature lower than the temperature required to maintain the fuel in a molten state. The cooling device may comprise a cooling chamber enclosing the second cavity and vibrator.

The vibrator may be a piezoelectric actuator and the cooling device may arranged to maintain the piezoelectric actuator in use at a temperature lower than the Curie temperature of the piezoelectric actuator. Although a piezoelectric actuator may still be effective to oscillate and act as a vibrator at temperatures above its Curie temperature, piezoelectric materials are considerably more efficient when operated at a temperature below their Curie temperature.

The vibrator may suitably be a piezoelectric actuator driven in bending mode.

The feed chamber may be in direct fluid connection with the nozzle. For instance, the feed chamber may be a capillary tube and the nozzle may be a narrowing at a distal end of the capillary tube.

The feed chamber is desirably substantially acoustically decoupled from the feed reservoir. For instance, the fuel may enter the feed chamber through a restriction arranged to minimise transmission of acoustic energy from the feed chamber to the reservoir, such as a restriction having a cross sectional area of less than $5\times10^{-6}$ $m^2$.

The liquid may be maintained at a pressure sufficiently in excess of atmospheric pressure to inhibit cavitation of the liquid in use. Suitably the liquid is degassed. For instance, the liquid may be maintained at a pressure from 0.1 to 5 MPa in excess of atmospheric pressure.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
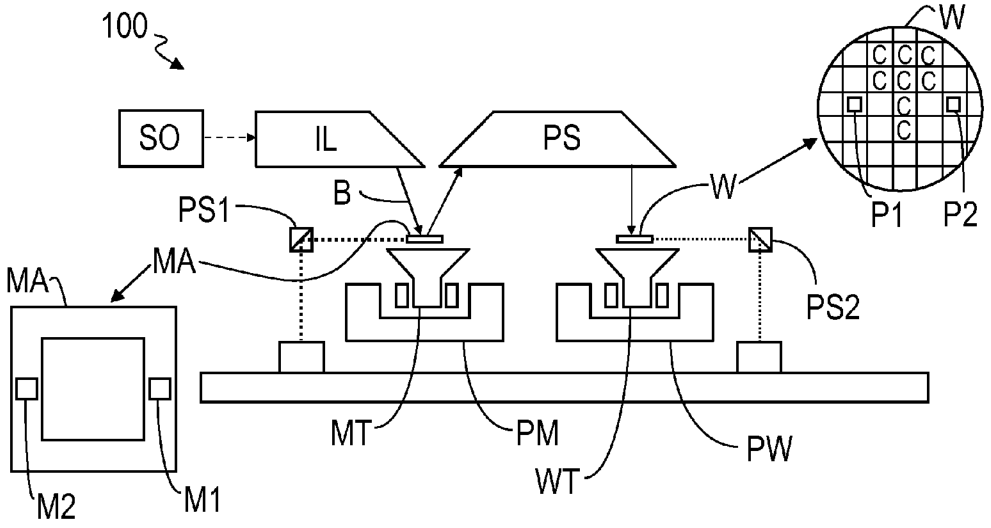
FIG. 1 schematically depicts a lithographic apparatus according to an embodiment of the invention.

FIG. 1 schematically depicts a lithographic apparatus 100 including a source collector module SO according to one embodiment of the invention. The apparatus comprises: an illumination system (illuminator) IL configured to condition a radiation beam B (e.g. EUV radiation); a support structure (e.g. a mask table) MT constructed to support a patterning device (e.g. a mask or a reticle) MA and connected to a first positioner PM configured to accurately position the patterning device; a substrate table (e.g. a wafer table) WT constructed to hold a substrate (e.g. a resist-coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

The illumination system may include various types of optical components, such as refractive, reflective, magnetic, electromagnetic, electrostatic or other types of optical components, or any combination thereof, for directing, shaping, or controlling radiation.

The support structure MT holds the patterning device MA in a manner that depends on the orientation of the patterning device, the design of the lithographic apparatus, and other conditions, such as for example whether or not the patterning device is held in a vacuum environment. The support structure can use mechanical, vacuum, electrostatic or other clamping techniques to hold the patterning device. The support structure may be a frame or a table, for example, which may be fixed or movable as required. The support structure may ensure that the patterning device is at a desired position, for example with respect to the projection system.

The term "patterning device" should be broadly interpreted as referring to any device that can be used to impart a radiation beam with a pattern in its cross-section such as to create a pattern in a target portion of the substrate. The pattern imparted to the radiation beam may correspond to a particular functional layer in a device being created in the target portion, such as an integrated circuit.

The patterning device may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam in different directions. The tilted mirrors impart a pattern in a radiation beam which is reflected by the mirror matrix.

The projection system, like the illumination system, may include various types of optical components, such as refractive, reflective, magnetic, electromagnetic, electrostatic or other types of optical components, or any combination thereof, as appropriate for the exposure radiation being used, or for other factors such as the use of a vacuum. It may be desired to use a vacuum for EUV radiation since gases may absorb too much radiation. A vacuum environment may therefore be provided to the whole beam path with the aid of a vacuum wall and vacuum pumps.

As here depicted, the apparatus is of a reflective type (e.g. employing a reflective mask).

The lithographic apparatus may be of a type having two (dual stage) or more substrate tables (and/or two or more mask tables). In such "multiple stage" machines the additional tables may be used in parallel, or preparatory steps may be carried out on one or more tables while one or more other tables are being used for exposure.

Referring to FIG. 1, the illuminator IL receives an extreme ultraviolet (EUV) radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the required plasma can be produced by irradiating a fuel, such as a droplet of material having the required line-emitting element, with a laser beam. The source collector module SO may be part of an EUV radiation source including a laser, not shown in FIG. 1, for providing the laser beam exciting the fuel. The resulting plasma emits output radiation, e.g. EUV radiation, which is collected using a radiation collector, disposed in the source collector module.

The laser and the source collector module may be separate entities, for example when a $CO_2$ laser is used to provide the laser beam for fuel excitation. In such cases, the radiation beam is passed from the laser to the source collector module with the aid of a beam delivery system comprising, for example, suitable directing mirrors and/or a beam expander. The laser and a fuel supply (i.e. fuel droplet generator) may be considered to comprise an EUV radiation source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross-section.

The radiation beam B is incident on the patterning device (e.g. mask) MA, which is held on the support structure (e.g. mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor system PS2 (e.g. using interferometric devices, linear encoders or capacitive sensors), the substrate table WT can be moved accurately, e.g. so as to position different target portions C in the path of the radiation beam B. Similarly, the first positioner PM and another position sensor system PS1 can be used to accurately position the patterning device (e.g. mask) MA with respect to the path of the radiation beam B. Patterning device (e.g. mask) MA and substrate W may be aligned using mask alignment marks M1, M2 and substrate alignment marks P1, P2.

The depicted apparatus could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-)magnification and image reversal characteristics of the projection system PS.

3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 2:
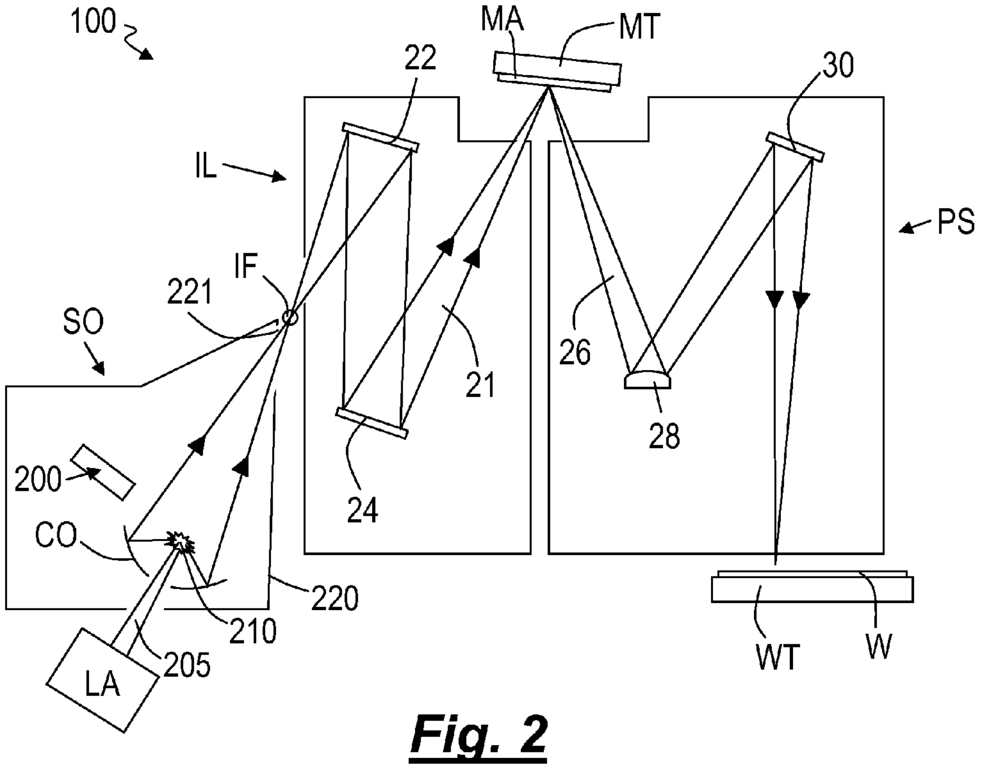
FIG. 2 is a more detailed view of the apparatus of FIG. 1, including a laser produced plasma (LPP) source collector module.

FIG. 2 shows the apparatus 100 in more detail, including the source collector module SO, the illumination system IL, and the projection system PS. The source collector module SO is constructed and arranged such that a vacuum environment can be maintained in an enclosing structure 220 of the source collector module SO.

A laser LA is arranged to deposit laser energy via a laser beam 205 into a fuel, such as fuel droplets of xenon (Xe), tin (Sn) or lithium (Li) which is provided from a fuel supply or fuel droplet generator 200, thereby creating a highly ionized plasma 210 with electron temperatures of several 10's of eV.

The energetic radiation generated during de-excitation and recombination of these ions is emitted from the plasma, collected and focussed by a near normal incidence collector optic CO.

A second laser (not shown) may be provided, the second laser being configured to preheat the fuel before the laser beam 205 is incident upon it. An LPP source which uses this approach may be referred to as a dual laser pulsing (DLP) source.

Radiation that is reflected by the collector optic CO is focused in a virtual source point IF. The virtual source point IF is commonly referred to as the intermediate focus, and the source collector module SO is arranged such that the intermediate focus IF is located at or near an opening 221 in the enclosing structure 220. The virtual source point IF is an image of the radiation emitting plasma 210.

Subsequently the radiation traverses the illumination system IL. The illumination system IL may include a facetted field mirror device 22 and a facetted pupil mirror device 24 arranged to provide a desired angular distribution of the radiation beam 21 at the patterning device MA, as well as a desired uniformity of radiation intensity at the patterning device MA. Upon reflection of the beam of radiation 21 at the patterning device MA, a patterned beam 26 is formed and the patterned beam 26 is imaged by the projection system PS via reflective elements 28, 30 onto a substrate W held by the substrate table WT.

More elements than shown may generally be present in the illumination system IL and projection system PS. Further, there may be more mirrors present than those shown in the Figures, for example there may be 1-6 additional reflective elements present in the projection system PS than shown in FIG. 2.

Figure 3:
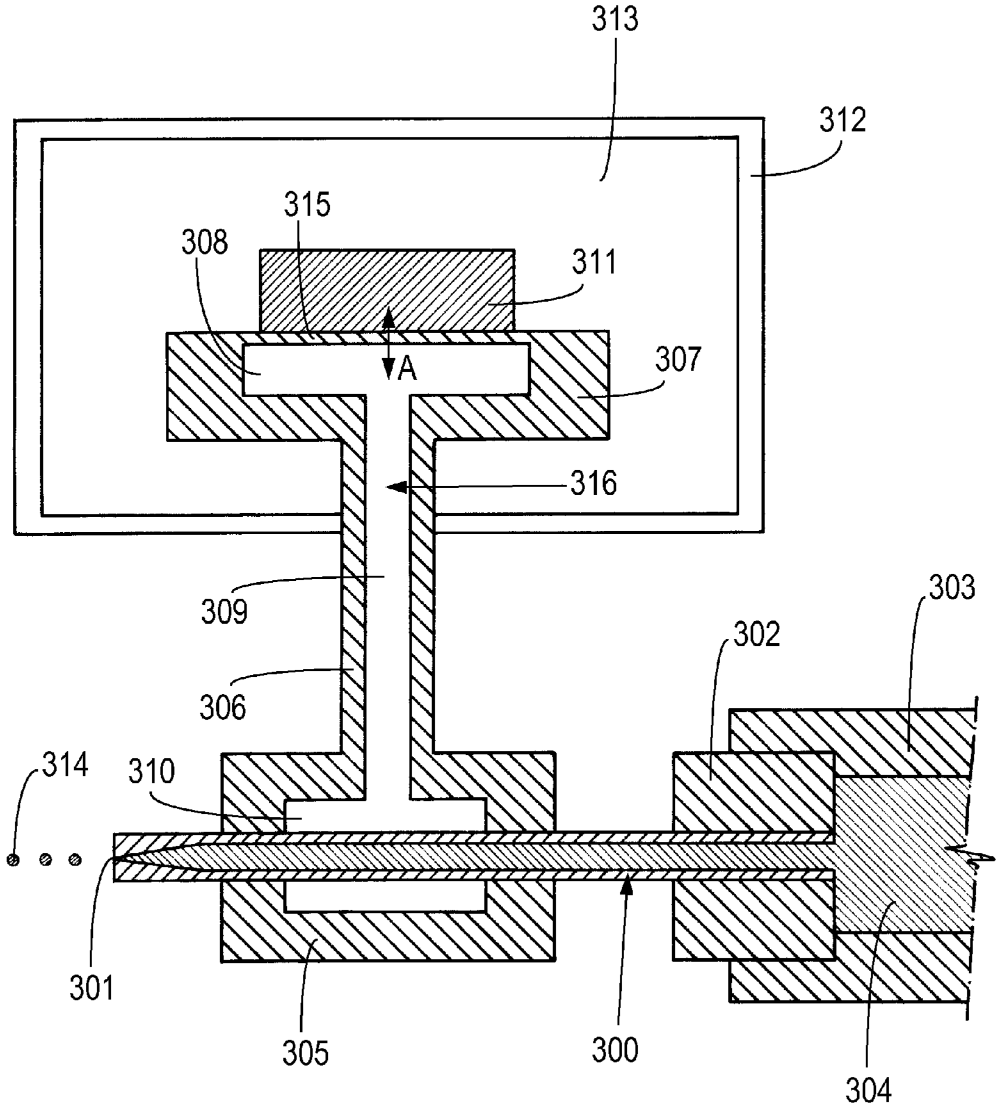
FIG. 3 schematically depicts a first embodiment of a fuel droplet generator forming part of a radiation source according to an embodiment of the invention, which may form part of the lithographic apparatus shown in FIGS. 1 and 2.

FIG. 3 shows schematically an embodiment of the fuel droplet generator 200 shown in FIG. 2 that is suitable for use with aspects of the invention. This embodiment of a fuel droplet generator comprises a reservoir 303 which contains a liquid fuel 304 in a molten state. For example, this fuel may be molten tin. The reservoir is connected to a capillary 300 by means of a connector 302. The capillary 300 has a proximal end in direct contact with the fuel liquid in the reservoir 303 and a distal end formed into a nozzle 301. A periodic stream of droplets 314 is shown being ejected from the nozzle 301.

A first enclosure 305 forms a first cavity 310 that surrounds a portion of capillary 300 and a fluid-tight connection is provided between the first enclosure 305 and the capillary 300. A bore 309 of a hollow connection tube 306 joins the first cavity 310 to a second cavity 308 which is enclosed in a second enclosure 307 to form drive cavity 316.

A vibrator 311, in this embodiment, a piezoelectric actuator arranged to be driven in bending mode, is firmly connected to an outer wall 315 of the second enclosure 307, which is thus an outer wall 315 of second cavity 308. In other embodiments, the vibrator may have alternative configurations, such as a stack of piezoelectric actuators mounted on top of each other to form a multilayer stack and driven in thickness mode. Such a stack can be mounted between the outer wall 315 of the second cavity 308 and an outer housing of the droplet generator (not shown).

A cooling chamber 312 surrounds the second enclosure and the vibrator 311 as well as a portion of the connection tube 306. A cooling device such as a refrigeration unit and heat exchanger (not shown) maintains the temperature within the cooling chamber 312 at a lower temperature than the temperature required for the fuel to be maintained in a molten state.

In an embodiment, the nozzle 301 may have a diameter at its outlet of 10 microns. Embodiments of the invention are not limited to nozzles with a diameter of 10 microns, any suitable nozzle diameter is in principle possible, such as 5 microns, 3 microns. The capillary 300 may for example be 50 millimeters long, with an outer diameter of 1 millimeter and a wall thickness of say 0.15 millimeters. Here also the dimensions of the capillary 300 and nozzle 301 are merely given as examples and are not considered to be limiting. The first cavity 310 may for example be around 10 mm to 20 mm long. The vibrator 311 is configured such that it may oscillate the outer wall 315 with a desired modulation frequency, in the direction marked AA, thereby modulating the pressure of liquid within the within the drive cavity 316 formed by the first 310 and second 308 cavities and the bore 309 of the connection tube 306.

In use, the liquid fuel 304 is held at pressure inside the reservoir 303 and fed to nozzle 301. This may be achieved for example by pressuring gas (not shown) which is also located in the reservoir 300, by a pumping device (not shown) such that pressure is applied to the molten fuel by the gas. As a result of the pressure a stream of fuel issues from the nozzle 301. In the absence of oscillations causing pressure fluctuations in the feed chamber formed by the capillary 300, the stream of fuel emerging from the nozzle 301 would naturally break up after travelling a distance from the nozzle 308 (the distance being for example 100-1000 times the diameter of the nozzle), thereby forming a stream of droplets. The droplets generated in this manner, without oscillatory excitation of the feed chamber, may have diameters which are around twice the outlet diameter of the nozzle 301 or slightly less than this. In the present example, droplets formed without oscillatory excitation may for example have a diameter of 19 microns. The droplets may be separated by a distance which is around 4.5 times the diameter of the nozzle. In this example the droplets may be separated by around 45 microns if no oscillatory excitation is applied. This natural breaking up of the fuel stream into droplets is known as Rayleigh break-up. The Rayleigh frequency, which corresponds with the rate of droplet production of the nozzle 301, is related to the mean velocity of the fuel at the nozzle and the diameter of the nozzle as set out hereinbefore.

Although Rayleigh break-up of the stream of fuel liquid 314 will occur without oscillatory stimulation of the pressure within the feed chamber capillary 300, such oscillatory stimulation is preferably used to control the break-up and modify it from its natural behavior. Modulating the pressure inside the feed chamber capillary 300 modulates the exit velocity of the liquid fuel from the nozzle 301, and causes the stream of liquid fuel to break-up into droplets in a controlled manner directly after leaving the nozzle. If the oscillatory frequency applied is sufficiently close to the Rayleigh frequency, droplets of fuel are formed, the droplets being separated by a distance which is determined by the mean exit velocity from the fuel nozzle 301 and by the oscillatory frequency applied.

If the frequency applied is significantly lower than the Rayleigh frequency, then instead of a series of fuel droplets being formed, clouds of fuel may be formed. A given cloud of fuel may include a group of droplets travelling at a relatively high speed and a group of droplets travelling at a relatively low speed (the speeds being relative to the average speed of the cloud of fuel). These may coalesce together to form a single fuel droplet. In this way a series of fuel droplets may be generated by applying an oscillatory frequency to the feed chamber which is significantly lower than the Rayleigh frequency. As still the spacing between the droplets is governed by mean exit velocity and the oscillation frequency the spacing between the droplets increases with decreasing oscillation frequency.

The liquid within the drive cavity 316, used to transfer oscillations from the vibrator 311 to the feed chamber capillary 300 is typically a liquid at both the temperature required to provide the fuel 304 in a molten state and also at the temperature within the cooling chamber 312. Typically this temperature within the cooling chamber may be room temperature, such as about 25° C., whereas the fuel 304 in the molten state may be at a temperature of, for example, about 240° C. or more. Suitably, the liquid may be degassed in a conventional manner such as by way of vacuum pumping prior to filling the drive cavity 316, or the liquid may be degassed within the drive cavity 316. Desirably, the liquid is pressurized in use in order to minimize risk of cavitation whereby acoustic losses may be generated. For instance the liquid may be subjected to a pressure of 0.1 to 5 MPa over atmospheric pressure. It is desirable that the liquid should behave essentially as wave guide to transfer acoustic energy from the second enclosure 308 to the first cavity 310. The presence of any gas bubbles within the drive cavity may lower the efficiency of acoustic transfer. A suitable liquid for use in the drive cavity 316 is a terphenyl based fluid such as Therminol 66®.

In order to improve the efficiency of oscillatory driving of the pressure in the feed chamber capillary 300 through the drive cavity 316 and the fluid therein, the vibrator may be operated at a frequency corresponding to a first resonance frequency of the capillary 300, which may be its fundamental vibrational resonance frequency or an overtone (i.e. higher order vibrational mode) thereof. By providing the drive cavity with a tuning device, a second resonance frequency of the drive cavity may be adjusted to match a first resonance frequency of the feed chamber capillary 300. In this manner, optimal transfer of energy from the vibrator 311 to the molten fuel in the feed chamber capillary 300 may be achieved to give large velocity modulations at the nozzle 301 leading to greater control of droplet formation. This may be particularly effective when controlling droplet formation by coalescence of high velocity droplets with low velocity droplets when the oscillatory drive frequency from the vibrator 311 is substantially less than the Rayleigh frequency.

With the cooling chamber 312 maintained with its interior at temperature of around room temperature, the vibrator 311 may be a piezoelectric actuator driven to operate at temperature well below its Curie temperature whereby it may operate with high-efficiency to transfer oscillations through the wall 315 to the liquid within the drive cavity. The use of the drive cavity to allow the vibrator 311 to be remotely positioned relative to the hot fuel chamber allows the vibrator to be operated at a lower temperature and also removes the need to maintain direct contact between a vibrator 311 and an outer wall of the feed chamber capillary 300, with an interface that would be subject to temperatures approaching the melt temperature of the fuel, or subject to wide fluctuations in temperature during maintenance, when the feed chamber capillary 300 may be cooled to ambient temperature. Instead, the liquid within the drive cavity 316 provides acoustic contact with an outer wall of the feed chamber capillary 300 whilst preventing or reducing heat transfer. It is not essential for the contact between the first enclosure 305, enclosing the first cavity, and the outer wall of feed chamber capillary 300 to be a direct contact capable of transferring acoustic energy.

Figure 4:
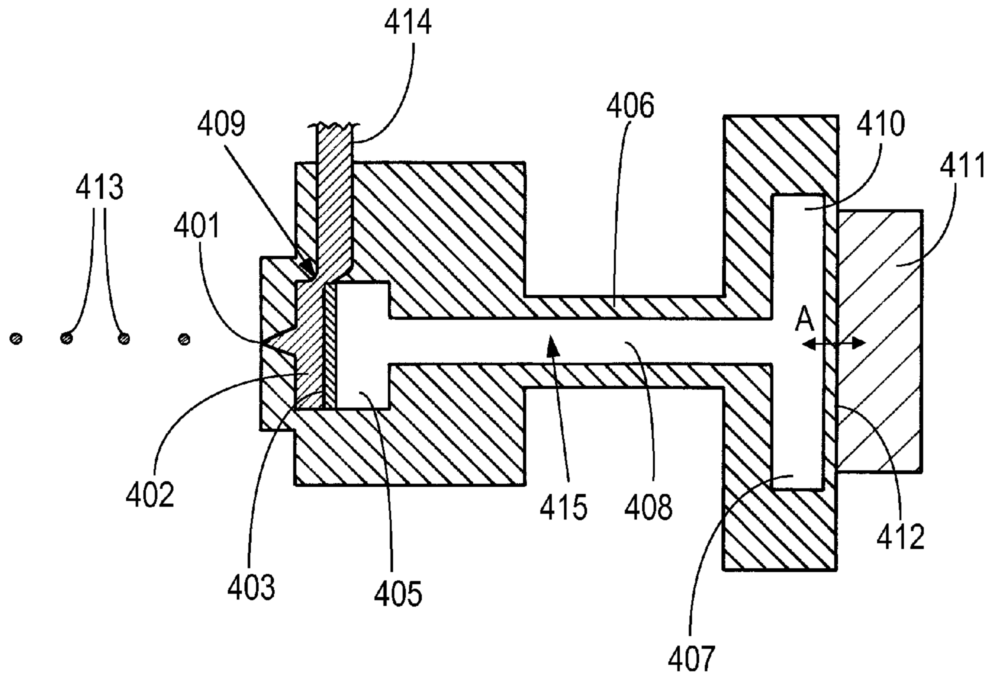
FIG. 4 a second embodiment of a fuel droplet generator forming part of a radiation source according to an embodiment of the invention, which may form part of the lithographic apparatus shown in FIGS. 1 and 2.

FIG. 4 shows schematically an embodiment of the fuel droplet generator 200 shown in FIG. 2 suitable for use with embodiments of the invention.

The fuel droplet generator comprises a fuel reservoir (not shown) which holds liquid fuel in a molten state (e.g. molten metal such as molten tin) to be fed to a feed chamber 402 through a conduit 414. The conduit 414 is connected to the feed chamber 402 through a restriction 409 whereby the feed chamber 402 is substantially acoustically isolated from the conduit 414 and fuel reservoir. The feed chamber 402 has a nozzle 401. A periodic stream of droplets 413 is shown being ejected from the nozzle 401.

A first cavity 405 is in contact with an outer face 403 of the feed chamber 402. A bore 408 of a hollow connection tube 406 joins the first cavity 405 to a second cavity 407 to form the drive cavity.

A vibrator 411, in this embodiment, a piezoelectric actuator arranged to be driven in bending mode, is firmly connected to an outer wall 412 of the second cavity 410.

A cooling chamber (not shown for this embodiment) may surround the second cavity 407 and the vibrator 411 as well as a portion of the connection tube 406. A cooling device such as a refrigeration unit and heat exchanger (not shown) may maintain the temperature of the vibrator 411 and second cavity 407 at a lower temperature than the temperature required for the fuel to be maintained in a molten state.

The nozzle 401 may, for instance have a diameter at its outlet of 10 microns, or 5 microns or 3 microns or any suitable value. The piezoelectric actuator as vibrator 411 may be fixed to the outer wall 412 using an adhesive or cement. The vibrator 411 is configured such that it may oscillate the outer wall 412 of the second cavity with a desired modulation frequency, in the direction marked AA, thereby modulating the pressure of liquid within the within the drive cavity formed by the first 405 and second 410 cavities and the bore 408.

In use, the liquid fuel is held inside the reservoir and fed to the nozzle as set out for the first embodiment. As a result of the pressure of molten fuel generated at the nozzle 401, a stream of molten fuel issues therefrom.

As with the embodiment shown in FIG. 3, for this embodiment, oscillations from the vibrator 411 may be transferred through the outer wall 412 of second cavity and through the liquid in the drive cavity cause outer face 403 of the feed chamber to oscillate, causing oscillatory pressure fluctuations in the molten fuel in the feed chamber 402.

Modulating the pressure inside the feed chamber 402 modulates the exit velocity of the liquid fuel from the nozzle 401, and causes the stream of liquid fuel to break-up into droplets in a controlled manner directly after leaving the nozzle, as already set out for the first embodiment described hereinbefore. If the oscillatory frequency applied is sufficiently close to the Rayleigh frequency, droplets of fuel are formed, the droplets being separated by a distance which is determined by the mean exit velocity from the fuel nozzle 401 and by the oscillatory frequency applied. If the frequency applied is significantly lower than the Rayleigh frequency, then instead of a series of fuel droplets being formed, clouds of fuel may be formed. A given cloud of fuel may include a group of droplets travelling at a relatively high speed and a group of droplets travelling at a relatively low speed (the speeds being relative to the average speed of the cloud of fuel). These may coalesce together to form a single fuel droplet. In this way a series of fuel droplets may be generated by applying an oscillatory frequency to the feed chamber which is significantly lower than the Rayleigh frequency. As the spacing between the droplets under these conditions is also governed by mean exit velocity and the oscillation frequency, the spacing between the droplets increases with decreasing oscillation frequency.

The examples and features as set out for the embodiment of the fuel droplet generator 200 as shown in FIG. 3 are also applicable to the embodiment shown in FIG. 4.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, LEDs, photonic devices, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multilayer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The term "lens", where the context allows, may refer to any one or combination of various types of optical components, including refractive, reflective, magnetic, electromagnetic and electrostatic optical components.

The term "EUV radiation" may be considered to encompass electromagnetic radiation having a wavelength within the range of 5-20 nm, for example within the range of 13-14 nm, or example within the range of 5-10 nm such as 6.7 nm or 6.8 nm.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

What is claimed is:

1. A radiation source comprising:

a fuel droplet generator arranged to provide a stream of droplets of fuel, the fuel droplet generator comprising a nozzle, a feed chamber, the feed chamber having an outer face in contact with a drive cavity, wherein when the drive cavity is filled with a liquid, and the liquid is arranged to be drivable to undergo oscillation by a vibrator operably connected to the drive cavity, said oscillation is transmissible to said molten fuel in the feed chamber from the outer face of the feed chamber through the liquid;

a reservoir, and a pump arranged to supply a flow of fuel in molten state from the reservoir through the feed chamber and out of the nozzle as the stream of droplets; and at least one laser configured to vaporize at least some of said droplets of fuel to generate radiation.

2. The radiation source of claim 1, wherein the feed chamber has a first resonant frequency and wherein the drive cavity has a second resonant frequency.

3. The radiation source of claim 1, wherein the drive cavity comprises a tuning device so that the second resonant frequency of the drive cavity is variable.

4. The radiation source of claim 1, wherein the drive cavity comprises a first cavity in direct contact with the outer face of the feed chamber, wherein the first cavity is in fluidic connection with a second cavity through a bore of a connection tube, and wherein the second cavity has the vibrator operably connected thereto, wherein the first cavity, second cavity and connection tube are filled with the liquid, and wherein the first cavity is drivable to undergo oscillation by acoustic transmission of said oscillation from the second cavity through the liquid, through the connection tube.

5. The radiation source of claim 4, wherein the second cavity comprises a tuning device whereby the second resonant frequency of the drive cavity is variable.

6. The radiation source of claim 4, wherein the vibrator is arranged to oscillate an outer wall of the second cavity to drive the liquid to undergo oscillation in use.

7. The radiation source of claim 1, wherein the fuel droplet generator comprises a cooling device arranged to maintain the vibrator, in use, at a temperature lower than the temperature required to maintain said fuel in a molten state.

8. The radiation source of claim 4, wherein the fuel droplet generator comprises a cooling device arranged to maintain the second cavity and vibrator, in use, at a temperature lower than the temperature required to maintain the fuel in a molten state.

9. The radiation source of claim 8, wherein the cooling device is a cooling chamber enclosing the second cavity and vibrator.

10. The radiation source of claim 7, wherein the vibrator is a piezoelectric actuator, and wherein the cooling device is arranged to maintain the piezoelectric actuator in use at a temperature lower than the Curie temperature of the piezoelectric actuator.

11. The radiation source of claim 1, wherein the feed chamber is in direct fluid connection with the nozzle.

12. The radiation source of claim 11, wherein the feed chamber is a capillary tube and the nozzle is a narrowing at a distal end of the capillary tube.

13. The radiation source of claim 1, wherein the feed chamber is substantially acoustically decoupled from the feed reservoir.

14. The radiation source of claim 13, wherein the fuel enters the feed chamber through a restriction having a cross sectional area of less than $5\times10^{-6}$ $m^2$.

15. The radiation source of claim 1, wherein the liquid is maintained at a pressure sufficiently in excess of atmospheric pressure to inhibit cavitation of the liquid in use.

16. A lithographic apparatus comprising:

a radiation source arranged to generate a radiation beam, the radiation source comprising a fuel droplet generator arranged to provide a stream of droplets of fuel, the fuel droplet generator comprising a nozzle, a feed chamber, the feed chamber having an outer face in contact with a drive cavity, wherein when the drive cavity is filled with a liquid, and the liquid is arranged to be drivable to undergo oscillation by a vibrator operably connected to the drive cavity, said oscillation is transmissible to said molten fuel in the feed chamber from the outer face of the feed chamber through the liquid;

a reservoir, and a pump arranged to supply a flow of fuel in molten state from the reservoir through the feed chamber and out of the nozzle as the stream of droplets; and at least one laser configured to vaporize at least some of said droplets of fuel to generate radiation;

an illumination system configured to condition the radiation beam;

a support constructed to support a patterning device, the patterning device being capable of imparting the radiation beam with a pattern in its cross-section to form a patterned radiation beam;

a substrate table constructed to hold a substrate; and a projection system configured to project the patterned radiation beam onto a target portion of said substrate.

17. A fuel droplet generator for providing a stream of droplets of fuel for a radiation source, the fuel droplet generator comprising:

a nozzle;

a feed chamber having an outer face in contact with a drive cavity configured to be filled with a liquid arranged to be drivable to undergo oscillation by a vibrator operably connected to the drive cavity, said oscillation being transmissible to said molten fuel in the feed chamber from the outer face of the feed chamber through the liquid;

a reservoir; and a pump arranged to supply a flow of fuel in molten state from the reservoir through the feed chamber and out of the nozzle as a stream of droplets.

18. A method comprising:

pumping molten fuel from a reservoir, through a feed chamber and out through a nozzle, the feed chamber having an outer face in contact with a first cavity filled with a liquid;

driving the first cavity to undergo oscillation by a vibrator, the oscillation being transmitted through the liquid and through the outer face of the feed chamber to the fuel in the feed chamber;

emitting a stream of fuel droplets from the nozzle; and vaporizing at least some of the droplets of fuel with a laser to generate radiation.

* * * * *